US012574719B2

(12) United States Patent
Hong

(10) Patent No.: US 12,574,719 B2
(45) Date of Patent: Mar. 10, 2026

(54) METHOD AND DEVICE FOR PRIORITY CONFIGURATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 495 days.

(21) Appl. No.: 18/019,461

(22) PCT Filed: Aug. 18, 2020

(86) PCT No.: PCT/CN2020/109891
§ 371 (c)(1),
(2) Date: Feb. 2, 2023

(87) PCT Pub. No.: WO2022/036571
PCT Pub. Date: Feb. 24, 2022

(65) Prior Publication Data
US 2023/0308856 A1      Sep. 28, 2023

(51) Int. Cl.
*H04W 8/18*        (2009.01)
*H04W 68/02*      (2009.01)

(52) U.S. Cl.
CPC ........... *H04W 8/183* (2013.01); *H04W 68/02* (2013.01)

(58) Field of Classification Search
CPC .............................. H04W 8/183; H04W 68/02
See application file for complete search history.

(56) References Cited

U.S. PATENT DOCUMENTS

2017/0359800 A1*  12/2017  Cui ........................ H04W 64/00
2018/0042054 A1    2/2018  Han
2018/0368099 A1  12/2018  Chen et al.

FOREIGN PATENT DOCUMENTS

CN          102573065 A        7/2012
CN          107211444 A        9/2017
CN          110581809 A      12/2019
WO      WO 2019164325 A1      8/2019

OTHER PUBLICATIONS

PCT/CN2020/109891 English translation of International Search Report dated May 20, 2021, 2 pages.
European Patent Application No. 20949783.3 Search and Opinion dated Mar. 14, 2024, 10 pages.
Chinese Patent Application No. 202080001867.2, Office Action dated Jan. 12, 2025, with English translation, 22 pages.

* cited by examiner

*Primary Examiner* — Elton Williams
(74) *Attorney, Agent, or Firm* — Cozen O'Connor

(57)                ABSTRACT

A method for priority configuration in a terminal operating in a communications network includes a number of steps. A terminal receives configuration information for type priority sent by a base station. The configuration information for type priority includes an association relationship between a communication operation type and a type priority. The terminal determines, on the basis of the configuration information for type priority, a first operation priority of a first communication operation and a second operation priority of a second communication operation. A base station sends configuration information for type priority to a terminal.

18 Claims, 8 Drawing Sheets

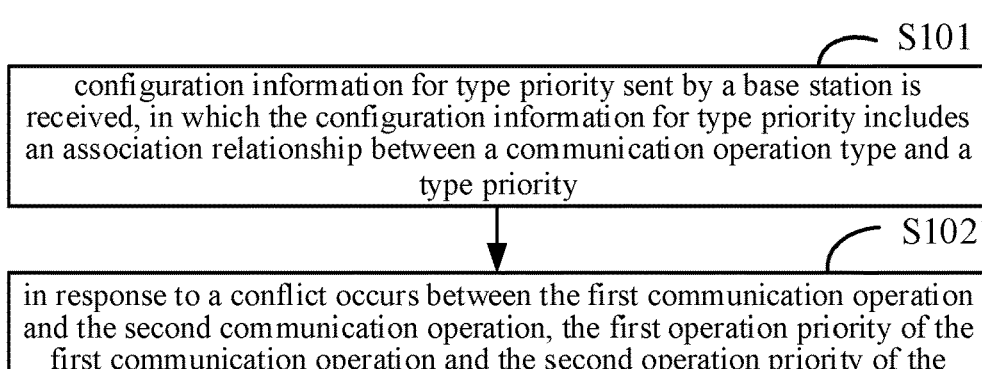

S101 configuration information for type priority sent by a base station is received, in which the configuration information for type priority includes an association relationship between a communication operation type and a type priority

S1021 in response to a conflict occurs between the first communication operation and the second communication operation, the first operation priority of the first communication operation and the second operation priority of the second communication operation are determined based on the configuration information for type priority

S103 the first communication operation or the second communication operation is performed based on the first operation priority and the second operation priority

FIG. 3

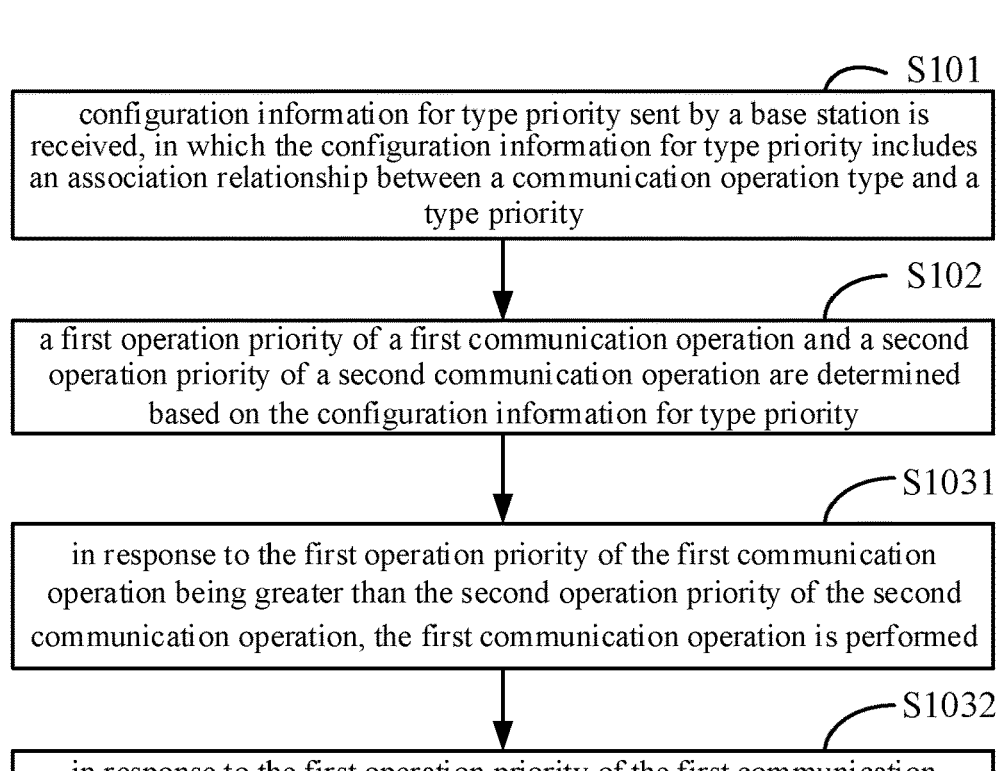

S101 configuration information for type priority sent by a base station is received, in which the configuration information for type priority includes an association relationship between a communication operation type and a type priority

S102 a first operation priority of a first communication operation and a second operation priority of a second communication operation are determined based on the configuration information for type priority

S1031 in response to the first operation priority of the first communication operation being greater than the second operation priority of the second communication operation, the first communication operation is performed

S1032 in response to the first operation priority of the first communication operation being less than the second operation priority of the second communication operation, the second communication operation is performed

FIG. 4

S201 configuration information for type priority is sent to the terminal, in which the configuration information for type priority includes an association relationship between a communication operation type and a type priority

FIG. 7

S2011 the configuration information for type priority is sent to more than one terminal, in which the configuration information for type priority sent to different terminals is different or the configuration information for type priority sent to at least two of the different terminals is the same

FIG. 8

S202 broadcast information is sent to the terminal, the broadcast information is configured to indicate that the base station stores the configuration information for type priority

S2012 in response to receiving a request to obtain the configuration information for type priority sent by the terminal, the configuration information for type priority is sent to the terminal

FIG. 9

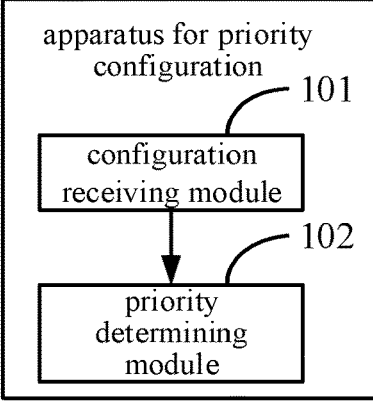

apparatus for priority configuration

101 configuration receiving module

102 priority determining module

FIG. 10

METHOD AND DEVICE FOR PRIORITY CONFIGURATION

CROSS-REFERENCE TO RELATED APPLICATION

This application is the US national phase application of International Application No. PCT/CN2020/109891, filed on Aug. 8, 2020, the entire contents of which are incorporated herein by reference for all purposes.

TECHNICAL FIELD

The disclosure relates to a field of communication technologies, in particular to a method and device for priority configuration.

BACKGROUND

A terminal such as a cell phone can interact with a base station based on a SIM (Subscriber Identity Module) card.

Generally, the terminal may be a single-card terminal containing a single SIM card; or may be a multi-card terminal containing multiple SIM cards, in which the multiple SIM cards may belong to the same operator or different operators.

The terminal, regardless of whether it is a single card terminal or multi-card terminal, is often called on to perform multiple communication operations, both simultaneously and sequentially. Performing flexible scheduling of the communication operations by a terminal becomes an important task for successful operation of the terminal.

SUMMARY

According to a first aspect of the present disclosure, a method for priority configuration is provided, the method is applied to a terminal, and the method includes:

receiving configuration information for type priority sent by a base station, in which the configuration information for type priority includes an association relationship between a communication operation type and a type priority; and determining, based on the configuration information for type priority, a first operation priority of a first communication operation and a second operation priority of a second communication operation.

According to a second aspect of the present disclosure, a method for priority configuration is provided, the method is applied to a base station, and the method includes:

sending configuration information for type priority to a terminal, in which the configuration information for type priority includes an association relationship between a communication operation type and a type priority.

According to a third aspect of the present disclosure, a terminal is provided, the terminal includes:

a processor;

a memory configured to store processor-executable instructions;

in which the processor is configured to implement a method for priority configuration. The method includes:

receiving configuration information for type priority sent by a base station, in which the configuration information for type priority includes an association relationship between a communication operation type and a type priority; and determining, based on the configuration information for type priority, a first operation priority of a first communication operation and a second operation priority of a second communication operation.

According to a fourth aspect of the present disclosure, a base station is provided, the base station includes:

a processor;

a memory configured to store processor-executable instructions;

in which the processor is configured to implement a method for priority configuration. The method includes:

sending configuration information for type priority to a terminal, in which the configuration information for type priority includes an association relationship between a communication operation type and a type priority.

BRIEF DESCRIPTION OF THE DRAWINGS

In order to more clearly illustrate the technical solutions in embodiments of the present disclosure, the following is a brief description of the drawings used in the description of the embodiments, and it is clear that the drawings in the following description are only some of the embodiments of the present disclosure, and that other drawings may be obtained from these drawings without creative effort by a skilled person in the art.

FIG. 3 is a flowchart of another method for priority configuration illustrated according to embodiments of the present disclosure.

FIG. 4 is a flowchart of another method for priority configuration illustrated according to embodiments of the present disclosure.

FIG. 7 is a flowchart of a method for priority configuration applicable to a base station illustrated according to embodiments of the present disclosure.

FIG. 8 is a flowchart of another method for priority configuration illustrated according to embodiments of the present disclosure.

FIG. 9 is a flowchart of another method for priority configuration illustrated according to embodiments of the present disclosure.

FIG. 10 is a block diagram of an apparatus for priority configuration applicable to a terminal illustrated according to embodiments of the present disclosure.

DETAILED DESCRIPTION

The following will be a clear and complete description of the technical solutions in embodiments of the present disclosure in conjunction with the accompanying drawings of embodiments of the present disclosure, and it is clear that the embodiments described are only a portion of embodiments of the present disclosure, and not all of them. Based on embodiments in the present disclosure, all other embodiments obtained by a person skilled in the art without making creative labor fall within the scope of protection of the present disclosure.

Figures 1, 2:
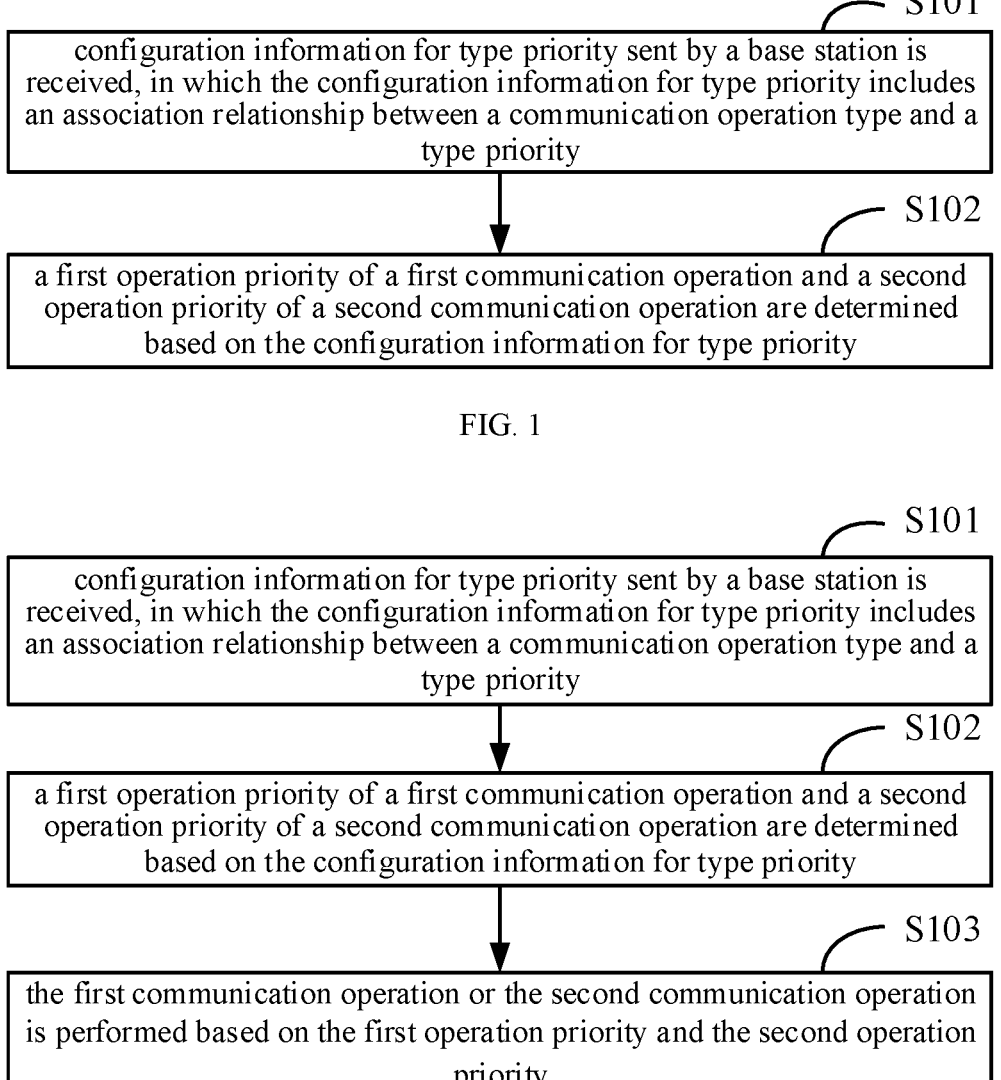
FIG. 1 is a flowchart of a method for priority configuration applicable to a terminal illustrated according to embodiments of the present disclosure.
FIG. 2 is a flowchart of another method for priority configuration illustrated according to embodiments of the present disclosure.

FIG. 1 is a flowchart of a method for priority configuration applicable to a terminal illustrated according to embodiments of the present disclosure. The method shown in this embodiment is applicable to a terminal. The terminal includes but is not limited to, a cell phone, a tablet, a wearable device, a sensor, an IoT device, and other electronic devices. The terminal may communicate with a base station as a user device. The base station includes but is not limited to, a 4G base station, a 5G base station, a 6G base station. In an embodiment, the base station may be a base station to which the method for priority configuration described in any of the subsequent embodiments applies. The terminal may be a single card terminal or a multi-card terminal.

As shown in FIG. 1, the method for priority configuration may include the following steps.

In step S101, configuration information for type priority sent by a base station is received, in which the configuration information for type priority includes an association relationship between a communication operation type and a type priority.

In an embodiment, the base station may send the configuration information for type priority to a terminal, the configuration information including an association relationship between the communication operation type and the type priority, and the terminal, upon receiving the configuration information from the base station, may determine the association relationship between the communication operation type and the type priority based on the configuration information. The presentation of the configuration information may be set as desired, for example, the configuration information may be in the form of a table or in the form of a key-value pair.

In an embodiment, the communication operation type includes at least one of: a SIM card type, a communication service type, or a paging reason type. For ease of description, the SIM card type, the communication service type, or the paging reason type that constitutes the communication operation type is referred to herein as a subtype.

In an embodiment, the configuration information for type priority is configured to determine an operation priority corresponding to the communication operation type. For example, the configuration information for type priority may include a correspondence relationship between the type and the type priority. A plurality of subtypes constituting the communication operation may first be determined, and a combination of the plurality of subtypes may be used as a communication operation type, and the operation priority corresponding to the communication operation type may be determined based on the type priority of the plurality of subtypes.

In an embodiment, the SIM card type is for a multi-card terminal. In the multi-card terminal, there are various methods to classify the SIM card types, for example, according to the operator to which the SIM card belongs; or according to the function of the SIM card, which may include, for example, a video browsing type SIM card, a voice call type SIM card, etc. Regardless of whether different SIM cards belong to the same operator or different operators, the SIM cards can be divided into different types. It should be noted that the SIM card function mentioned herein may be a common function of a SIM card or a special function of a SIM card, which is not limited in this embodiment. For the convenience of description, at least two SIM cards in the multi-card terminal are hereinafter referred to as the first SIM card and the second SIM card, respectively.

In an embodiment, the communication service type is the type of communication service corresponding to the information sent and received by the terminal. For example, when the terminal sends and receives voice call type information, the service type is voice call type. It is noted that the information sent and received by the terminal may include signaling and may also include data.

In an embodiment, there are various methods of classifying the communication service types, as illustrated by the following examples. In one example, the classification may be based on an application scene, for example, the communication service types may include eMBB (Enhanced Mobile Broadband), mMTC (Massive Machine Type of Communication), URLLC (Ultra-reliable and Low Latency Communications). In another example, other ways may be used to classify the service types, for example, the communication service types may include voice call type, video call type, video browsing type, game business type, and so on. Of course, the method for classifying the communication service types here is an exemplary illustration and is not specifically limited.

In an embodiment, the paging reason type is the type of the paging reason corresponding to the paging to which the terminal needs to respond. For example, the paging reason type may include Terminating Conversational Call, Terminating Streaming Call, Terminating Background Call, etc. Alternatively, other methods may be used to classify the paging reason type, which are not discussed here.

Different cases will be described below in conjunction with specific embodiments, and will not be elaborated here.

In step S102, a first operation priority of a first communication operation and a second operation priority of a second communication operation are determined based on the configuration information for type priority.

In an embodiment, when performing the first communication operation and the second communication operation, the terminal may determine the first operation priority of the first communication operation and the second operation priority of the second communication operation based on the configuration information for type priority sent by the base station. It should be noted that the communication operation performed by the terminal here may be the communication operation being performed by the terminal or the communication operation to be performed by the terminal. For example, for the communication operation of responding to a paging, it may be that the terminal responds to the paging or it may be that the terminal determines that it needs to respond to the paging.

In an embodiment, in the configuration information for type priority sent by the base station, the communication operation type and the type priority may be in one-to-one correspondence. For example, in the configuration information, when the communication operation type includes one subtype, the terminal may use the type priority of the subtype as the communication operation priority; when the communication operation type includes multiple subtypes and the combination of multiple subtypes corresponds to one type priority, then the terminal may use the type priority corresponding to the combination as the communication operation priority. The priority may be represented in numerical form, for example, the larger the number value, the higher the priority.

In an embodiment, in the configuration information for type priority sent by the base station, different subtypes constituting the communication operation type correspond to different type priorities, and then the terminal may determine the communication operation priority based on a plurality of subtypes corresponding to the communication operation type. For example, the type priority may be a priority score, and the terminal may use the weighted sum of the priorities of the subtypes as the priority of the communication operation type based on the preset weights corresponding to the subtypes. Or, the terminal may directly use the sum or average of the priorities of the subtypes as the priority of the communication operation type, etc. Commonly, the higher the priority value, the higher the priority.

In the above embodiments, the subtypes constituting the communication operation type may be identified by an integer value or a string, etc. In the base station and the terminal, the correspondence relationship between the identifier and each subtype can be preset, and then the terminal, when obtaining the configuration information sent by the base station, can determine the specific communication operation type corresponding to the identifier in the configuration information based on the correspondence relationship.

Thus, the process illustrated in FIG. 1 is completed. Based on the above process, the operation priority of each communication operation can be determined. Based on these operation priorities, the terminal can flexibly and reasonably perform scheduling when handling multiple communication operations.

FIG. 2 is a flowchart of another method for priority configuration illustrated according to embodiments of the present disclosure. As illustrated in FIG. 2, the method further includes the following step.

In step S103, the first communication operation or the second communication operation is performed based on the first operation priority and the second operation priority.

FIG. 3 is a flowchart of another method for priority configuration illustrated according to embodiments of the present disclosure. As illustrated in FIG. 3, determining the first operation priority of the first communication operation and the second operation priority of the second communication operation based on the configuration information for type priority includes the following step.

In step S1021, in response to a conflict occurs between the first communication operation and the second communication operation, the first operation priority of the first communication operation and the second operation priority of the second communication operation are determined based on the configuration information for type priority.

The first communication operation is a communication operation corresponding to the first SIM card in the terminal and the second communication operation is a communication operation corresponding to the second SIM card in the terminal.

It can be understood that, for a multi-card terminal, the conflict may arise from a simultaneous use of multiple SIM cards. For example, when the first SIM card and the second SIM card receive paging messages separately, the two SIM cards cannot respond to a paging at the same time, then the operation of the first SIM card responding to a paging is in conflict with the operation of the second SIM card responding to a paging; when the first SIM card is sending and receiving information, if the second SIM card receives paging, the operation of the first SIM card sending and receiving information and the operation of the second SIM responding to a paging cannot be performed at the same time, then there is a conflict between the operation of the first SIM card sending and receiving information and the operation of the second SIM card responding to a paging.

Based on this, FIG. 4 is a flowchart of another method for priority configuration illustrated according to embodiments of the present disclosure. As illustrated in FIG. 4, performing the first communication operation or the second communication operation based on the first operation priority and the second operation priority includes the following steps.

In step S1031, in response to the first operation priority of the first communication operation being greater than the second operation priority of the second communication operation, the first communication operation is performed.

In step S1032, in response to the first operation priority of the first communication operation being less than the second operation priority of the second communication operation, the second communication operation is performed.

In an embodiment, the terminal may compare the first operation priority and the second operation priority, and perform the communication operation corresponding to the higher operation priority. When the first operation priority is higher than the second operation priority, the first communication operation is performed; when the second operation priority is higher than the first operation priority, the first communication operation is performed.

It is to be noted that, when the first operation priority is equal to the second operation priority, one of the communication operations may be selected according to the actual situation, such as notifying the user for manual selection, or randomly selecting a communication operation, etc., which is not limited in this embodiment.

Accordingly, the terminal can obtain the priority corresponding to each communication type from the configuration information sent by the base station, and in the case of communication conflict among multiple SIM cards, the terminal can automatically determine the priorities of the communication operation types corresponding to the communication operations and perform the corresponding communication operation, so that the terminal can automatically select among the communication operations having the conflict without manual operation by the user, which improves the user experience.

Figure 5:
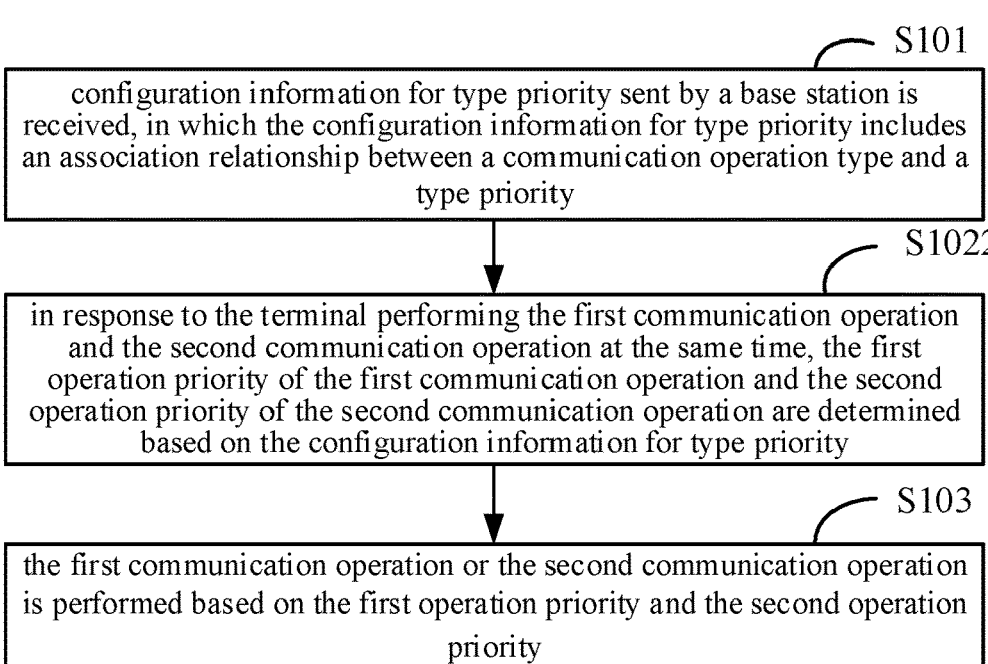
FIG. 5 is a flowchart of another method for priority configuration illustrated according to embodiments of the present disclosure.

FIG. 5 is a flowchart of another method for priority configuration illustrated according to embodiments of the present disclosure. As illustrated in FIG. 5, determining the first operation priority of the first communication operation and the second operation priority of the second communication operation based on the configuration information for type priority includes the following step.

In step S1022, in response to the terminal performing the first communication operation and the second communication operation at the same time, the first operation priority of the first communication operation and the second operation priority of the second communication operation are determined based on the configuration information for type priority.

The first communication operation and the second communication operation include sending and receiving service information via a SIM card.

In an embodiment, the first communication operation and the second communication operation are associated with a first SIM card or a second SIM card respectively. For example, the first communication operation is sending and receiving service information via the first SIM card, and the second communication operation is sending and receiving service information via the second SIM card.

In another embodiment, the first communication operation and the second communication operation may also both be associated with a SIM card in the terminal, for example, both the first communication operation and the second communication operation are associated with the first SIM card.

Based on step S1022, performing the first communication operation or the second communication operation based on the first operation priority and the second operation priority includes the following steps.

In step S1033, different transmission resources are allocated for the first communication operation and the second communication operation based on the first operation priority and the second operation priority.

In step S1034, the first communication operation and the second communication operation are performed through different transmission resources.

The transmission resources may include available resources of the terminal, such as time-frequency resources, antenna port resources, etc.; and may also include scheduled resources, such as channel resources, etc.

The terminal may allocate transmission resources based on the first operation priority of the first communication operation and the second operation priority of the second communication operation. For example, when the first operation priority is higher than the second operation priority, more transmission resources are allocated for the first communication operation; alternatively, sufficient transmission resources may be allocated for the first communication operation first, and then the transmission resources to be allocated for the second communication operation are determined from the unallocated transmission resources.

For example, when the first SIM card handles both the first communication operation and the second communication operation, and the first communication operation is a video browsing type service and the second communication operation is a voice session type service, it may usually be determined that the first operation priority is higher than the second operation priority if the first SIM card is a SIM card dedicated to handling video services. As a result, the terminal can allocate more or even all of the transmission resources for the first communication operation.

For example, when the first SIM card handles the first communication operation and the second SIM card handles the second communication operation, and both the first communication operation and the second communication operation are video browsing type services, it may usually be determined that the first operation priority is higher than the second operation priority if the first SIM card is a SIM card dedicated to handling video services and the second SIM card is a SIM card dedicated to handling voice sessions. As a result, the terminal can allocate more transmission resources for the first communication operation or prioritize the allocation of transmission resources for the first communication operation.

Of course, the above embodiments are exemplary illustration, and in practical application, the first communication operation or the second communication operation may also be performed in other ways, which are not limited by this embodiment.

The method of performing the first communication operation or the second communication operation in the present disclosure is illustrated below by three specific embodiments.

Embodiment 1: both the first communication operation and the second communication operation include responding to a paging.

In an embodiment, in response to the first communication operation including responding to a first paging via the first SIM card and the second communication operation including responding to a second paging via the second SIM card, a first operation priority of the first communication operation and a second operation priority of the second communication operation are determined based on the configuration information for type priority. It is to be noted that responding to a paging may include sending a paging response to a received paging message, and may also include establishing a communication connection for the service corresponding to the responded paging.

In an embodiment, in some types of terminals (e.g. dual SIM dual standby single-pass terminal), when the first SIM card needs to respond to the first paging and the second SIM card needs to respond to the second paging, the first communication operation corresponding to the first SIM card may be in conflict with the second communication operation corresponding to the second SIM card. Since the first SIM card and the second SIM card cannot respond to a paging at the same time, for example, the operation of responding to a paging is to initiate random access, the first SIM card and the second SIM card cannot initiate random access at the same time, so they cannot respond to a paging at the same time, then there is a conflict between the operation of the first SIM card responding to the first paging and the operation of the second SIM card responding to the second paging.

Based on the existence of the conflict, in response to the first operation priority of the first communication operation being greater than the second operation priority of the second communication operation, the first paging is responded to via the first SIM card; and in response to the first operation priority being less than the second operation priority of the second communication operation, the first paging is responded to via the second SIM card.

In an embodiment, in a case that the first SIM card needs to respond to the first paging and the second SIM card needs to respond to the second paging, the first operation priority of the first communication operation corresponding to the first SIM card may be determined, and the second operation priority of the second communication operation corresponding to the second SIM card may be determined. Then the first operation priority and the second operation priority may be compared. When the first operation priority is greater than the second operation priority, the first paging is responded to via the first SIM card, and when the first operation priority is less than the second operation priority, the second paging is responded to via the second SIM card.

In an embodiment, the communication operation type may include a paging reason type and/or a SIM card type.

In an embodiment, the communication operation type and the type priority may be in one-to-one correspondence in the configuration information for type priority sent by the base station. For example, the communication operation type may include two subtypes, one being the paging reason type or the communication service type and the other one being the SIM card type. In the following, Table 1 is taken as an example for illustration.

TABLE 1

| SIM card type | paging reason type or communication service type | priority |
|---|---|---|
| Video-type SIM card | Called session type | 1 |
| Video-type SIM card | Called background type | 2 |
| Video-type SIM card | Video browsing type | 3 |
| Voice-type SIM card | Called session type | 3 |
| Voice-type SIM card | Called background type | 4 |
| Voice-type SIM card | Video browsing type | 2 |

As shown in Table 1, in the configuration information for type priority, the combination of multiple subtypes corresponds to one type priority, and then the terminal can use the type priority corresponding to the combination as the communication operation priority. The priority is represented by a number, and a larger number indicates a higher priority.

For example, the first SIM card is a voice-type SIM card, and the paging reason corresponding to the first paging that needs to be responded to is the called session type, as can be seen from Table 1, the first operation priority of the first communication operation is 3; the second SIM card is a video-type SIM card, and the paging reason corresponding to the second paging that needs to be responded to is the called session type, as can be seen from Table 1, the second operation priority of the second communication operation is 1. Accordingly, it can be determined that the first operation priority is greater than the second operation priority, and the terminal responds to the first paging via the first SIM card, in which the second paging can be ignored on the basis of the response to the first paging.

In an embodiment, the communication operation type and the type priority may be in one-to-one correspondence in the configuration information for type priority sent by the base station. For example, the communication operation type may include one subtype. In Table 2, for example, the communication operation type may be the paging reason type.

TABLE 2

| paging reason type or communication service type | priority |
|---|---|
| Called session type | 1 |
| Called background type | 2 |
| Video browsing type | 1 |

For example, the paging reason corresponding to the first paging that the first SIM card needs to respond to is the called background type, and the first operation priority of the first communication operation is 2 as shown in Table 2; the paging reason corresponding to the second paging that the second SIM card needs to respond to is the called session type, and the second operation priority of the second communication operation is 1 as shown in Table 2. Accordingly, it can be determined that the first operation priority is greater than the second operation priority, and the terminal responds to the second paging via the second SIM card, in which the first paging can be ignored on the basis of the response to the first paging.

Of course, one subtype included in the communication operation type may also be a SIM card type, and the same method as in the above embodiment may be used to perform the corresponding communication operation, which will not be repeated here.

In addition to the priority configuration information as shown in Tables 1 and 2, the different subtypes constituting the communication operation type in the configuration information for type priority sent by the base station may correspond to different type priorities, so that the terminal may determine the communication operation priority according to several subtypes corresponding to the communication operation type. For example, the weighted sum of the priorities of the subtypes may be used as the priority of that communication operation type based on the preset weights corresponding to respective subtypes. In the following, Table 3 is taken as an example for illustration.

TABLE 3

| SIM card type | Priority | Paging reason type or communication operation type | Priority |
|---|---|---|---|
| Video-type SIM card | 1 | Called session type | 2 |
| Voice-type SIM card | 3 | Called background type | 4 |
| / | / | Video browsing type | 1 |

For example, the terminal presets that the weight corresponding to the SIM card type is 60% and the weight corresponding to the paging reason type is 40%. For example, the first SIM card is a voice-type SIM card, and the paging reason corresponding to the first paging that needs to be responded to is the called session type, it can be known from Table 3 in combination with the preset weights that the first operation priority of the first communication operation is 2.6 (3*60%+2*40%); the second SIM card is a video-type SIM card, and the paging reason corresponding to the second paging that needs to be responded to is the called session class, it can be known from Table 3 in combination with the preset weights that the second operation priority of the second communication operation is 1.4 (1*60%+2*40%). Accordingly, it can be determined that the first operation priority is greater than the second operation priority, and the terminal responds to the first paging via the first SIM card, in which the second paging can be ignored on the basis of the response to the first paging.

It should be noted that the preset weights are used here as an example, and in practice, based on the table as shown in Table 3, other ways to determine the operation priority can be used, which are not limited here.

In addition, when the first operation priority corresponding to the first paging is equal to the second operation priority corresponding to the second paging, the terminal may randomly select a paging to respond to, or notify the user to select manually, etc., which is not limited in this embodiment.

In an embodiment, in some types of terminals (e.g. dual SIM dual standby dual pass terminal), the first SIM card responding to the first paging may not be in conflict with the second SIM card responding to the second paging. Based on this, different transmission resources can be allocated for the first communication operation and the second communication operation based on the first operation priority and the second operation priority, and then the first communication operation and the second communication operation can be performed through different transmission resources.

For example, when the first operation priority is greater than the second operation priority, the transmission resources may be allocated for the first communication operation first and then for the second communication operation; when the first operation priority is less than the second operation priority, the transmission resources may be allocated for the second communication operation first and then for the first communication operation. Based on the determined transmission resources, the first communication operation and the second communication operation can be performed simultaneously.

Here, the method for determining the priority can be seen in the above-mentioned embodiments and will not be repeated here.

Embodiment 2: the first communication operation includes sending and receiving service information via the first SIM card, and the second communication operation includes responding to a paging via the second SIM card.

In an embodiment, in response to the first communication operation including sending and receiving service information via the first SIM card and the second communication operation including responding to a paging via the second SIM card, a first operation priority of the first communication operation and a second operation priority of the second communication operation are determined based on the configuration information for type priority. It is to be noted that responding to a paging includes establishing a communication connection for the service corresponding to the responded paging.

In an embodiment, in certain types of terminals (e.g. dual SIM dual standby single-pass terminal), when the first SIM card sends and receives service information, the second SIM card needs to respond to a paging, the first communication operation corresponding to the first SIM card may be in conflict with the second communication operation corresponding to the second SIM card. Since the first SIM card sends and receives service information and the second SIM card needs to respond to a paging, which cannot be performed simultaneously, then there is a conflict between the operation of the first SIM card sending and receiving information and the operation of the second SIM card responding to a paging.

Based on the existence of the conflict, in response to the first operation priority of the first communication operation being greater than the second operation priority of the second communication operation, the sending and receiving service information via the first SIM card is continued; and in response to the first operation priority of the first communication operation being less than the second operation priority of the second communication operation, the sending and receive information via the first SIM card is stopped, and the paging is responded to via the second SIM card.

In an embodiment, in a case that the second SIM card needs to respond to a paging while the first SIM card sends and receives service information, the first operation priority of the first communication operation corresponding to the first SIM card and the second operation priority of the second communication operation corresponding to the second SIM card may be determined first. The first operation priority and the second operation priority are then compared, and when the first operation priority is greater than the second operation priority, the sending and receiving the information via the first SIM card is continued; when the first operation priority is less than the second operation priority, the sending and receiving the information via the first SIM card is stopped and the paging is responded to via the second SIM card.

In an embodiment, the communication operation type may include a paging reason type and/or a SIM card type.

In an embodiment, the communication operation type may include two subtypes, one being the paging reason type or communication service type and the other one being the SIM card type. Table 1 is still used as an example for illustration.

For example, the first SIM card is a video-type SIM card, the sending and receiving service information belongs to the video browsing type service, and it is known from Table 1 that the first operation priority of the first communication operation is 3; the second SIM card is a voice-type SIM card, and the paging reason corresponding to the paging that needs to be responded to is the called background type, and it is known from Table 1 that the second operation priority of the second communication operation is 4. Accordingly, it can be determined that the first operation priority is operation priority is less than the second operation priority, and the terminal stops continuing to send and receive information via the first SIM card and responds to the paging via the second SIM card.

Based on a similar method, when it is determined that the first operation priority is greater than the second operation priority, the terminal can continue sending and receiving information via the first SIM card and ignore the paging received by the second SIM card. This is not repeated here.

In an embodiment, the communication operation type may include only one subtype, for example, which may be a paging reason type or a communication service type; or which may also be a SIM card type. The specific implementation is similar to the above embodiment corresponding to Table 2 and will not be repeated here.

In an embodiment, in the configuration information for type priority sent by the base station, respective subtypes constituting the communication operation type may also correspond to one type priority, so that the terminal may use the weighted sum of the priorities of the subtypes as the priority of the communication operation type according to the preset weights corresponding to respective subtypes. The specific implementation is similar to the above embodiment corresponding to Table 3. The terminal can determine the first operation priority corresponding to the first communication operation (i.e., the first SIM card sends and receives service information), and the second operation priority corresponding to the second communication operation (i.e., the second SIM card needs to respond to a paging), respectively, based on the preset weight information and the priorities in the priority configuration information. The first communication operation or the second communication operation is then performed based on the determined operation priorities.

In addition, when the first operation priority corresponding to the first SIM card sending and receiving messages is equal to the second operation priority corresponding to the second SIM card that needs to respond to a paging, the terminal may select a communication operation according to the actual situation, such as keeping the current sending and receiving messages and ignoring the paging, or notifying the user to select manually, etc., which is not limited in this embodiment.

In an embodiment, in some types of terminals (e.g. dual SIM dual standby dual pass terminal), there may also be no conflict between the first SIM card sending and receiving service messages and the second SIM card responding to the second paging. Based on this, different transmission resources may be allocated for the first communication operation and the second communication operation based on the first operation priority and the second operation priority, and then the first communication operation and the second communication operation may be performed through different transmission resources. Specific reference may be made to the above embodiments, which will not be repeated herein.

Embodiment 3: both the first communication operation and the second communication operation include sending and receiving service information via SIM card.

In an embodiment, in a case that multiple SIM cards in the terminal can send and receive service information simultaneously, in response to the first communication operation including sending and receiving service information via the first SIM card and the second communication operation including sending and receiving service information via the second SIM card, a first operation priority of the first communication operation and a second operation priority of the second communication operation are determined based on the configuration information for type priority.

In an embodiment, the communication operation type may include two subtypes, one being a paging reason type or a communication service type and the other one being a SIM card type. In another embodiment, the communication operation type may include only one subtype, which may be, for example, a paging reason type or a communication service type; or may also be a SIM card type.

Different transmission resources are allocated for the first communication operation and the second communication operation based on the first operation priority and the second operation priority, and the first communication operation and the second communication operation are performed through different transmission resources.

The transmission resources may include available resources of the terminal, such as time-frequency resources, antenna port resources, etc.; and may also include scheduled resources, such as channel resources, etc. The terminal may allocate the transmission resources based on the first operation priority of the first communication operation and the second operation priority of the second communication operation. For example, when the first operation priority is higher than the second operation priority, more transmission resources are allocated for the first communication operation; alternatively, sufficient transmission resources may be allocated for the first communication operation first, and then transmission resources to be allocated for the second communication operation are determined from the unallocated transmission resources.

Furthermore, in addition to the first SIM card performing the first communication operation and the second SIM card performing the second communication operation as described in the above three embodiments, in an embodiment, the first communication operation and the second communication operation may also be communication operations performed by the same SIM card in the terminal. For the same SIM card, the method for determining the priority is similar to that for multiple SIM cards, and may be any one of the methods or a combination of the methods in the above embodiments.

When this SIM card does not support simultaneous performing of multiple communication operations, the first communication operation or second communication operation may be performed based on the first operation priority and the second operation priority.

When the SIM card supports simultaneous performing of multiple communication operations, different transmission resources may be allocated for the first communication operation and the second communication operation based on the first operation priority and the second operation priority, and then the first communication operation and the second communication operation may be performed through different transmission resources.

The method for performing the communication operation is also similar to the first SIM card performing the first communication operation and the second SIM card performing the second communication operation, which will not be repeated herein.

So far, the description of "performing the first communication operation or the second communication operation" is completed. Based on the method of the present disclosure, the terminal, whether it is a single-card terminal or a multi-card terminal, can flexibly schedule the communication operations based on priorities for multiple communication operations handled by the terminal. On the one hand, in a case that there is a communication conflict among multiple communication operations, the terminal can automatically select among the communication operations having the conflict without manual operation by the user, which improves the user experience. On the other hand, when the terminal performs multiple communication operations at the same time, the terminal can allocate transmission resources for each communication operation according to the priority, which realizes reasonable scheduling of resources.

In an embodiment, the configuration information for type priority is carried in the broadcast information and/or unicast information sent by the base station.

In an embodiment, the base station may carry the configuration information for type priority through the broadcast information, and the terminal may obtain the configuration information for type priority by receiving the broadcast information sent by the base station. For example, when the broadcast information is a system message, the configuration information for type priority may be carried in the system message.

The system message may be an existing system message, such as minimum system information (minimum SI), other system information (other SI), etc. Alternatively, the base station may define a new system message to carry the configuration information for type priority, which is not limited by this embodiment. After receiving the system message sent by the base station, the terminal can parse the system message and obtain the configuration information for type priority.

In an embodiment, the base station may carry the configuration information for type priority through the unicast information sent to the terminal. For example, when the base station knows that the target terminal is a multi-card terminal, then it may carry the configuration information for type priority in the unicast information sent to the target terminal.

By way of example, the configuration information for type priority may be carried in the RRCConnectionReconfiguration signaling sent by the base station to the terminal, and/or carried in the RRCConnectionResume signaling sent by the base station to the terminal, and/or carried in the RRCReconfiguration signaling sent by the base station to the terminal, and/or carried in the RRCResume signaling sent by the base station to the terminal.

Figure 6:
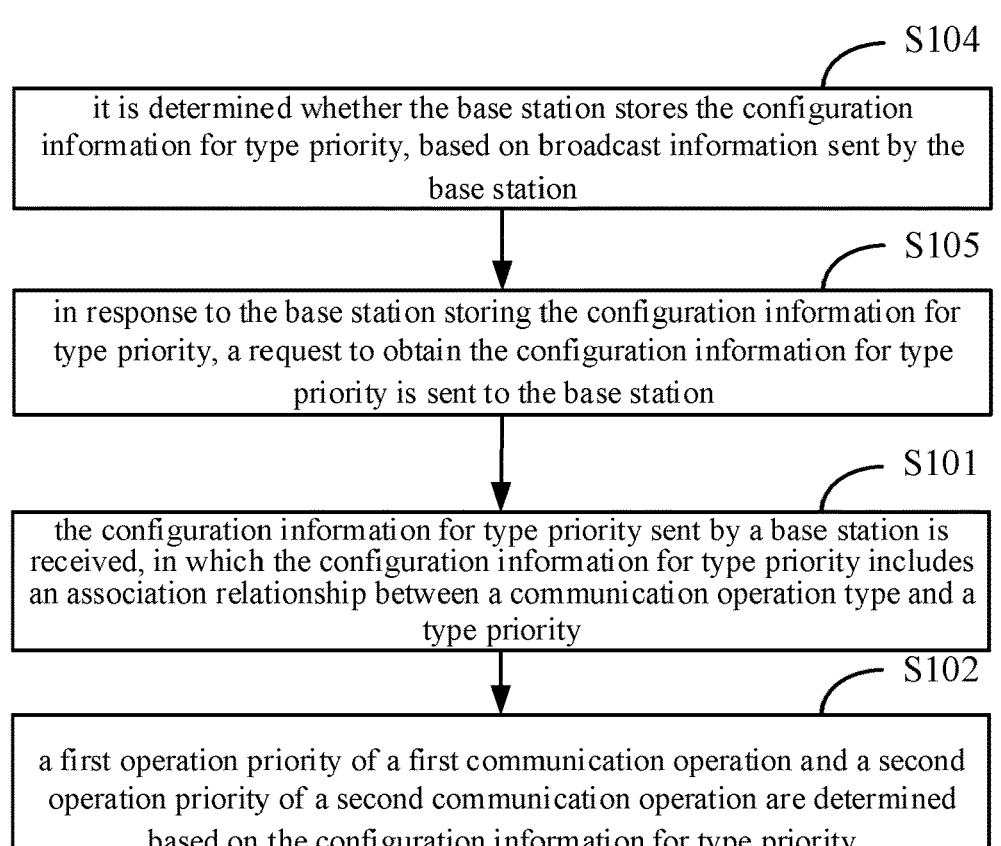
FIG. 6 is a flowchart of another method for priority configuration illustrated according to embodiments of the present disclosure.

FIG. 6 is a flowchart of another method for priority configuration illustrated according to embodiments of the present disclosure. As illustrated in FIG. 6, the method further includes the following steps.

In step S104, it is determined whether the base station stores the configuration information for type priority, based on broadcast information sent by the base station.

In step S105, in response to the base station storing the configuration information for type priority, a request to obtain the configuration information for type priority is sent to the base station.

In an embodiment, the base station may send broadcast information in which indication information is carried. The indication information is configured to indicate whether the base station stores configuration information for type priority.

The terminal may send to the base station the request to obtain the configuration information for type priority when determining that the configuration information for type priority is stored in the base station. The request may be carried in other system information requests sent to the base station.

The base station, upon receiving the request from the terminal, may determine that the terminal requires the configuration information for type priority, and then may send the configuration information for type priority to the terminal, for example by carrying the configuration information for type priority in the broadcast information and/or unicast information in the previous embodiment.

FIG. 7 is a flowchart of a method for priority configuration applicable to a base station illustrated according to embodiments of the present disclosure. The method for priority configuration illustrated in this embodiment is applicable to a base station. The base station includes but is not limited to a 4G base station, a 5G base station, a 6G base station. The base station may communicate with a terminal as a user device. The terminal includes but is not limited to a cell phone, a tablet, a wearable device, a sensor, an IoT device, and other electronic devices. In an embodiment, the terminal may be a terminal to which the method for priority configuration described in any of the above embodiments applies.

As illustrated in FIG. 7, the method for priority configuration may include the following step.

In step S201, configuration information for type priority is sent to the terminal, in which the configuration information for type priority includes an association relationship between a communication operation type and a type priority.

In an embodiment, the base station may send the configuration information to the terminal, the configuration information including the association relationship between the communication operation type and the type priority, and the terminal, upon receiving the configuration information from the base station, may determine the association relationship between the communication operation type and the priority based on the configuration information. The presentation of the configuration information may be set as desired. For example, the configuration information may be in the form of a table, and each table item in the table may represent the association relationship between a certain communication operation type and a priority. In an embodiment, the configuration information may be obtained by the base station from a core network.

In an embodiment, the communication operation type includes at least one of: a SIM card type, a communication service type, or a paging reason type. For ease of description, the SIM card type, the communication service type, or the paging reason type that constitutes the communication operation type is referred to herein as a subtype.

In an embodiment, the configuration information for type priority is configured to determine the operation priority corresponding to the communication operation type. For example, the configuration information for type priority may include a correspondence relationship between type and type priority. A plurality of subtypes constituting a communication operation may be determined first, and a combination of the plurality of subtypes may be used as a communication operation type, and the operation priority corresponding to the communication operation type may be determined based on the type priorities of the plurality of subtypes. Based on this, the configuration information may be configured to indicate the terminal to determine a first operation priority of a first communication operation, and a second operation priority of a second communication operation; and to enable the terminal to perform the first communication operation or perform the second communication operation based on the first operation priority and the second operation priority.

Accordingly, the terminal can determine the operation priority corresponding to the communication operation based on the configuration information for type priority sent by the base station, and perform the corresponding communication operation based on the operation priority, enabling the terminal to automatically perform flexible scheduling of the communication operation without manual operation by the user and improving the user experience.

In an embodiment, the configuration information for type priority is sent by the base station via broadcast information and/or unicast information.

In an embodiment, the base station may carry the configuration information via broadcast information, and the terminal may obtain the configuration information by receiving the broadcast information sent by the base station. For example, when the broadcast information is a system message, then the configuration information may be carried in the system message.

The system message may be an existing system message, such as minimum system information (minimum SI), other system information (other SI), etc. Alternatively, the base station may define a new system message to carry the configuration information, which is not limited by this embodiment. After receiving the system message sent by the base station, the terminal can parse the system message and obtain the configuration information.

In an embodiment, the base station may carry the configuration information through the unicast information sent to the terminal. For example, when the base station knows that the target terminal is a multi-card terminal, then it may carry the configuration information in the unicast information sent to the target terminal.

By way of example, the configuration information may be carried in the RRCConnectionReconfiguration signaling sent by the base station to the terminal, and/or carried in the RRCConnectionResume signaling sent by the base station to the terminal, and/or carried in the RRCReconfiguration signaling sent by the base station to the terminal, and/or carried in the RRCResume signaling sent by the base station to the terminal.

FIG. 8 is a flowchart of another method for priority configuration illustrated according to embodiments of the present disclosure. As illustrated in FIG. 8, sending configuration information to a terminal includes the following step.

In step S2011, the configuration information for type priority is sent to more than one terminal, in which the configuration information for type priority sent to different terminals is different or the configuration information for type priority sent to at least two of the different terminals is the same.

In an embodiment, the base station sends different configuration information for type priority to different terminals, and the configuration information for type priority corresponds to each terminal one by one.

In practice, when the base station broadcasts the configuration information, the base station may carry a terminal identifier (e.g., Mobile Equipment Identifier (MEID), International Mobile Equipment Identity (IMEI), etc.) in the sent configuration information, and the terminal, after receiving the configuration information, may determine whether the configuration information is consistent with its own identifier based on the terminal identifier, and if yes, the configuration information is saved; if not, the configuration information is discarded.

For example, the base station may broadcast a system message, and the system message includes configuration information 1 in which the identifier of a terminal A is carried. After receiving the configuration information 1, the terminal A can determine that the identifier in the configuration information 1 (i.e., the identifier of the terminal A) is consistent with itself, and then the terminal A saves this configuration information 1.

Of course, the base station may also unicast configuration information, and then the base station may send to the terminal the configuration information corresponding to it. For example, the base station unicasts the configuration information 1 corresponding to the terminal A to the terminal A and unicasts the configuration information 2 corresponding to the terminal B to the terminal B.

In an embodiment, the base station sends the same configuration information to at least two of the different terminals, and one configuration information may also correspond to multiple terminals. In the implementation, when the base station broadcasts the configuration information, one single configuration information that is sent may correspond to multiple terminal identifiers or carry a common identifier. Alternatively, when the base station broadcasts the configuration information, it may not carry the terminal identifier in the configuration information, and the base station may broadcast the configuration information to multiple corresponding terminals so that multiple terminals receiving the configuration information adopt the same configuration information. When the base station unicast the configuration information, it may unicast the same configuration information to more than one terminal. This embodiment is only an exemplary illustration, which may be determined according to the actual situation and will not be repeated here.

FIG. 9 is a flowchart of another method for priority configuration illustrated according to embodiments of the present disclosure. As illustrated in FIG. 9, the method further includes the following step.

In step S202, broadcast information is sent to the terminal. The broadcast information is configured to indicate that the base station stores the configuration information for type priority.

Sending the configuration information for type priority to the terminal includes the following step.

In step S2012, in response to receiving a request to obtain the configuration information for type priority sent by the terminal, the configuration information for type priority is sent to the terminal.

In an embodiment, the base station may send the broadcast information in which indication information is carried. The indication information is configured to indicate whether the base station stores the configuration information for type priority.

The terminal may send a request to obtain configuration information to the base station, when determining that the configuration information is stored in the base station. The request may be carried in other system information requests sent to the base station.

The base station, upon receiving the request from the terminal, may determine that the terminal needs the configuration information, and may then send the configuration information to the terminal, for example by carrying the configuration information in the broadcast information and/or unicast information in the above embodiments.

Corresponding to the aforementioned embodiments of the method for priority configuration, the present disclosure also provides embodiments of the apparatus for priority configuration.

FIG. 10 is a block diagram of an apparatus for priority configuration applicable to a terminal illustrated according to embodiments of the present disclosure. The apparatus illustrated in this embodiment is applicable to a terminal, the terminal includes but is not limited to, a cell phone, a tablet, a wearable device, a sensor, an IoT device, and other electronic devices. The terminal may communicate with a base station as a user device, the base station includes but is not limited to, a 4G base station, a 5G base station, a 6G base station. In an embodiment, the base station may be a base station to which the apparatus for priority configuration described in any of the subsequent embodiments applies.

The terminal may be a single-card terminal or a multi-card terminal. A multi-card terminal is configured with at least a first SIM card and a second SIM card, and the terminal may be considered as a multi-card terminal, for example, the terminal may optionally implement multi-card multi-standby, multi-card multi-standby single-pass, multi-card multi-standby multi-pass, etc. The multiple SIM cards can be connected to the same operator network or to different operators, which can be set as needed.

As illustrated in FIG. 10, the apparatus for priority configuration may include a configuration receiving module 101 and a priority determining module 102.

The configuration receiving module 101 is configured to receive configuration information for type priority sent by a base station, in which the configuration information for type priority includes an association between a communication operation type and a type priority.

The priority determining module 102 is configured to determine a first operation priority of a first communication operation and a second operation priority of a second communication operation based on the configuration information for type priority.

In an embodiment, the communication operation type includes at least one of: a SIM card type, a communication service type, or a paging reason type.

In an embodiment, the configuration information for type priority is configured to determine an operation priority corresponding to the communication operation type.

In an embodiment, the determining is performed in response to a conflict occurs between a first communication operation corresponding to a first SIM card and a second communication operation corresponding to a second SIM card.

Figure 11:
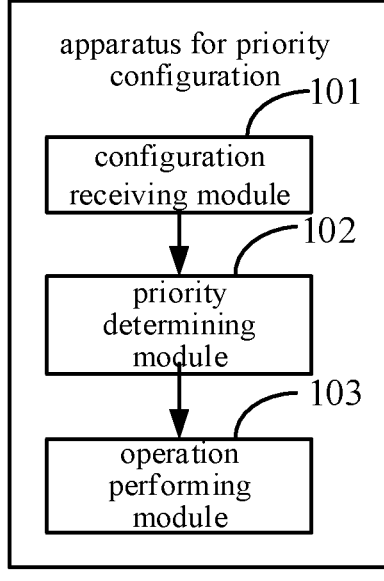
FIG. 11 is a block diagram of another apparatus for priority configuration illustrated according to embodiments of the present disclosure.

FIG. 11 is a block diagram of another apparatus for priority configuration illustrated according to embodiments of the present disclosure. As illustrated in FIG. 11, the apparatus further includes an operation performing module 103.

The operation performing module 103 is configured to perform the first communication operation or perform the second communication operation based on the first operation priority and the second operation priority.

In an embodiment, performing the first communication operation or the second communication operation based on the first operation priority and the second operation priority includes:

performing the first communication operation in response to the first operation priority of the first communication operation being greater than the second operation priority of the second communication operation; and performing the second communication operation in response to the first operation priority of the first communication operation being less than the second operation priority of the second communication operation.

In an embodiment, the communication operation type includes a paging reason type and/or a SIM card type, the first communication operation includes responding to a first paging via a first SIM card, and the second communication operation includes responding to a second paging via a second SIM card.

In an embodiment, the first communication operation includes sending and receiving service information via the first SIM card, and the second communication operation includes responding to a paging via the second SIM card.

In an embodiment, performing the first communication operation or the second communication operation based on the first operation priority and the second operation priority includes:

allocating different transmission resources for the first communication operation and the second communication operation based on the first operation priority and the second operation priority;

performing the first communication operation and the second communication operation through different transmission resources.

In an embodiment, the first communication operation and the second communication operation are associated with a first SIM card or a second SIM card respectively.

In an embodiment, the configuration information for type priority is carried in broadcast information and/or unicast information sent by the base station.

Figure 12:
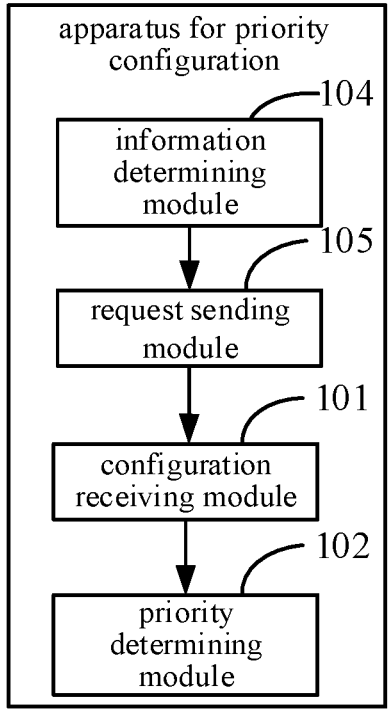
FIG. 12 is a block diagram of another apparatus for priority configuration illustrated according to embodiments of the present disclosure.

FIG. 12 is a block diagram of another apparatus for priority configuration illustrated according to embodiments of the present disclosure. As illustrated in FIG. 12, the apparatus further includes an information determining module 104 and a request sending module 105.

The information determining module 104 is configured to determine, based on broadcast information sent by the base station, whether the base station stores the configuration information for type priority.

The request sending module 105 is configured to send a request to obtain the configuration information for type priority to the base station in response to the base station storing the configuration information for type priority.

Figure 13:
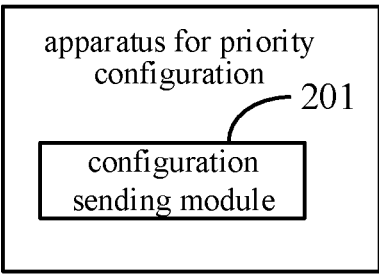
FIG. 13 is a block diagram of an apparatus for priority configuration applicable to a base station illustrated according to embodiments of the present disclosure.

FIG. 13 is a block diagram of an apparatus for priority configuration applicable to a base station illustrated according to embodiments of the present disclosure. The apparatus for priority configuration illustrated in this embodiment is applicable to a base station, the base station includes but is not limited to a 4G base station, a 5G base station, a 6G base station, the base station may communicate with a terminal as a user device, the terminal includes but is not limited to a cell phone, a tablet, a wearable device, a sensor, an IoT device, and other electronic devices. In an embodiment, the terminal may be a terminal to which the apparatus for priority configuration described in any of the above embodiments applies.

As illustrated in FIG. 13, the apparatus includes a configuration sending module 201.

The configuration sending module 201 is configured to send configuration information for type priority to a terminal, in which the configuration information for type priority includes an association relationship between a communication operation type and a type priority.

In an embodiment, the communication operation type includes at least one of: a SIM card type, a communication service type, or a paging reason type.

In an embodiment, the configuration information for type priority is configured to determine an operation priority corresponding to the communication operation type.

In an embodiment, the configuration information for type priority is sent via broadcast information and/or unicast information.

In an embodiment, the configuration sending module 201 is configured to send the configuration information for type priority to more than one terminal, in which the configuration information for type priority sent to different terminals is different or the configuration information for type priority sent to at least two of the different terminals is the same.

Figure 14:
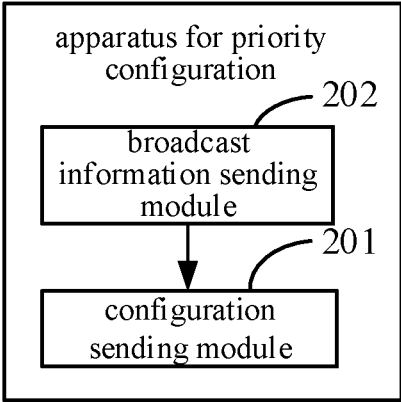
FIG. 14 is a block diagram of another apparatus for priority configuration illustrated according to embodiments of the present disclosure.

FIG. 14 is a block diagram of another apparatus for priority configuration illustrated according to embodiments of the present disclosure. As shown in FIG. 13, the apparatus further includes a broadcast information sending module 202.

The broadcast information sending module 202 is configured to send broadcast information to the terminal, the broadcast information is configured to indicate that the base station stores the configuration information for type priority.

The configuration sending module 201 is configured to send the configuration information for type priority to the terminal in response to receiving a request to obtain the configuration information for type priority sent by the terminal.

Figure 15:
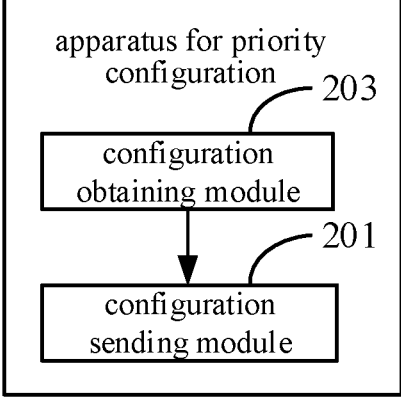
FIG. 15 is a block diagram of another apparatus for priority configuration illustrated according to embodiments of the present disclosure.

FIG. 15 is a block diagram of another apparatus for priority configuration illustrated according to embodiments of the present disclosure. As illustrated in FIG. 15, the apparatus further includes a configuration obtaining module 203.

The configuration obtaining module 203 is configured to obtain the configuration information for type priority from a core network.

With respect to the apparatus in the above embodiments, the specific way in which the individual modules perform their operations has been described in detail in the embodiment of the relevant method and will not be described in detail here.

For the apparatus embodiment, since it basically corresponds to the method embodiment, it is sufficient to refer to the method embodiment for the relevant part of the description. The apparatus embodiments described above are merely schematic, in which the modules described as separate components may or may not be physically separated, and the components shown as modules may or may not be physical modules, i.e., they may be located in one place or may be distributed to multiple network modules. Some or all of these modules can be selected according to practical needs to achieve the purpose of this embodiment solution. It can be understood and implemented by a person of ordinary skill in the art without creative work.

Embodiments of the present disclosure further provide an electronic device, including:

a processor;

a memory configured to store processor-executable instructions;

in which the processor is configured to implement the method for priority configuration and/or the method for priority configuration described in any of the above embodiments.

The electronic device may be a terminal or may be a base station.

Embodiments of the present disclosure further provide a computer readable storage medium having a computer program stored thereon, in which when the computer program is executed by a processor, steps of the method for priority configuration and/or the method for priority configuration described in any of the above-described embodiments are implemented.

Figure 16:
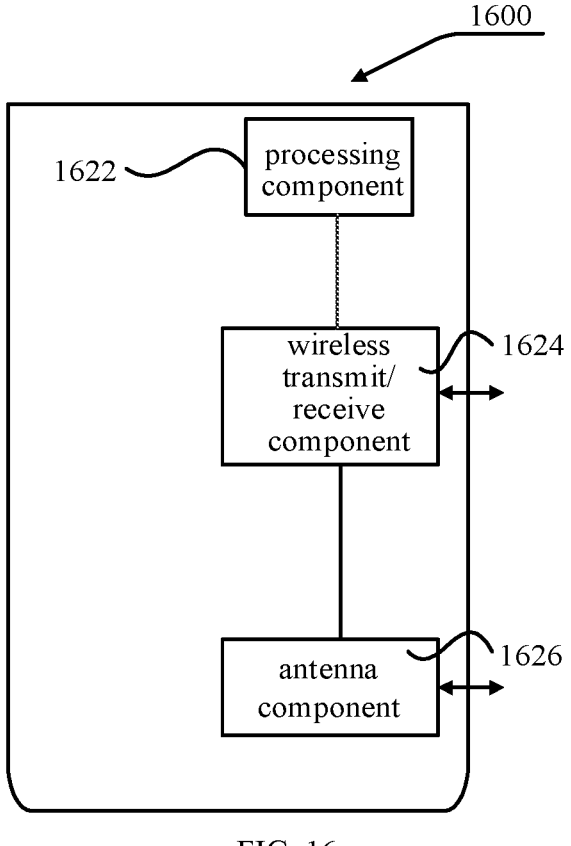
FIG. 16 is a block diagram of a device for priority configuration illustrated according to embodiments of the present disclosure.

As shown in FIG. 16, which is a block diagram of a device 1600 for priority configuration illustrated according to embodiments of the present disclosure. The device 1600 may be provided as a base station. Referring to FIG. 16, the device 1600 includes a processing component 1622, a wireless transmit/receive component 1624, an antenna component 1626, and a signal processing portion specific to the wireless interface, and the processing component 1622 may further include one or more processors. One of the processors of processing component 1622 may be configured to implement the method for priority configuration described in any of the above embodiments.

Figure 17:
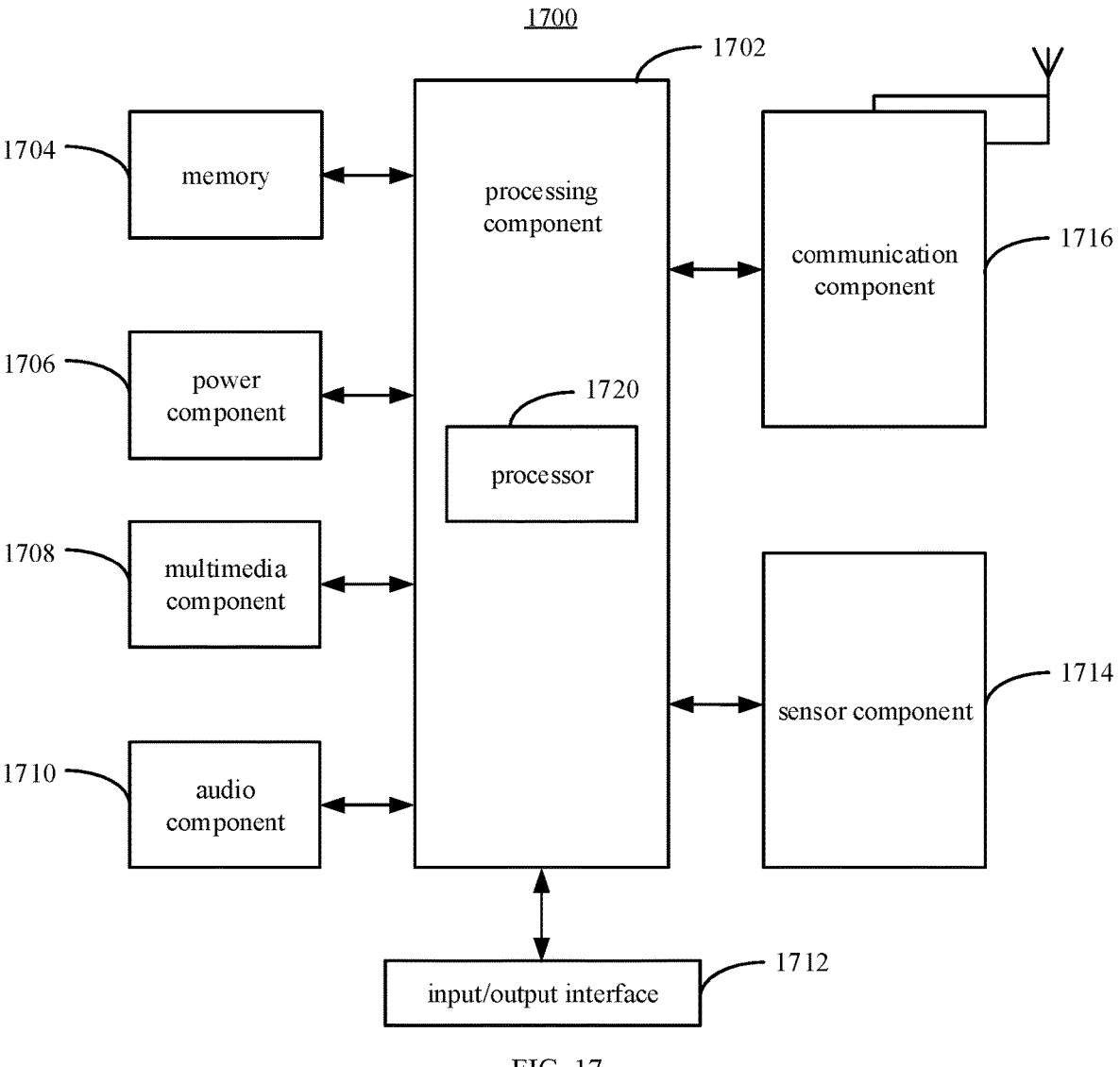
FIG. 17 is a block diagram of a device for priority configuration illustrated according to embodiments of the present disclosure.

FIG. 17 is a block diagram of a device 1700 for priority configuration illustrated according to embodiments of the present disclosure. For example, the device 1700 may be a cell phone, computer, digital broadcast terminal, messaging device, gaming console, tablet device, medical device, fitness device, personal digital assistant, etc.

Referring to FIG. 17, the device 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the device 1700, such as the operations associated with display, telephone calls, data communications, camera operations, and recording operations. The processing component 1702 may include one or more processors 1720 to perform all or part of the steps in the above described method. Moreover, the processing component 1702 may include one or more modules which facilitate the interaction between the processing component 1702 and other components. For example, the processing component 1702 may include a multimedia module to facilitate the interaction between the multimedia component 1708 and the processing component 1702.

The memory 1704 is configured to store various types of data to support the operation of the device 1700. Examples of such data include instructions for any applications or methods operated on the device 1700, contact data, phonebook data, messages, pictures, video, etc. The memory 1704 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a programmable read-only memory (PROM), a Read-Only Memory (ROM), a magnetic memory, a flash memory, a magnetic or optical disk.

The power component 1706 provides power to various components of the device 1700. The power component 1706 may include a power management system, one or more power sources, and any other components associated with the generation, management, and distribution of power in the device 1700.

The multimedia component 1708 includes a screen providing an output interface between the device 1700 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1708 includes a front-facing camera and/or a rear-facing camera. When the device 1700 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1710 is configured to output and/or input audio signals. For example, the audio component 1710 includes a microphone (MIC) configured to receive an external audio signal when the device 800 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the device 800. For instance, the sensor component 1714 may detect an open/closed status of the device 1700, relative positioning of components, e.g., the display and the keypad of the device 1700, a change in position of the device 1700 or a component of the device 1700, a presence or absence of user contact with the device 1700, an orientation or an acceleration/deceleration of the device 1700, and a change in temperature of the device 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, or a temperature sensor.

The communication component 1716 is configured to facilitate communication, wired or wirelessly, between the device 1700 and other devices. The device 1700 can access a wireless network based on a communication standard, such as WiFi, 2G or 3G, 4G LTE, or 5G NR or a combination thereof. In an embodiment, the communication component 1716 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In embodiments, the device 1700 may be implemented with at least one application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as included in the memory 1704, executable by the processor 1720 in the device 1700, for performing the above method. For example, the non-transitory computer-readable storage medium may be a ROM, a RAM, a CD-ROM, a magnetic tape, a floppy disc, an optical data storage device, and the like.

According to embodiments of the present disclosure, the terminal can determine the operation priorities corresponding to the communication operations according to the configuration information for type priority sent by the base station, and perform the corresponding communication operation based on the operation priorities, so that the terminal can realize flexible scheduling of the communication operations automatically without manual operation by the user, which improves the user experience.

Other embodiments of the disclosure will be apparent to those skilled in the art from consideration of the specification and practice of the disclosure disclosed here. The present disclosure is intended to cover any variations, uses, or adaptations of the disclosure following the general principles thereof and including such departures from the disclosure as come within known or customary practice in the art. It is intended that the specification and examples be considered as exemplary, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. The scope of the present disclosure is limited only by the appended claims.

It is noted that in this document, relationship terms such as first and second are used only to distinguish one entity or operation from another, and do not necessarily require or imply any such actual relationship or order between those entities or operations. The term "include" "comprise" or any other variation thereof, is intended to cover non-exclusive inclusion so that a process, method, article, or apparatus that includes a set of elements includes not only those elements, but also other elements not explicitly listed, or also includes elements that are inherent to such process, method, article, or apparatus. Without further limitation, the elements defined by the statement "including a/an . . . " do not preclude the existence of additional identical elements in the process, method, article, or apparatus that include the elements.

The methods and devices provided by embodiments of the present disclosure are described in detail above, and specific examples are applied in this document to illustrate the principles and implementation of the present disclosure. The above embodiments are used only to help understand the methods and core ideas of the present disclosure; at the same time, the general technical person in the field may change the specific implementation and application scope based on the ideas of the present disclosure. In summary, the content of this specification should not be understood as a limitation of the present disclosure.

What is claimed is:

1. A method for priority configuration, applied to a terminal, comprising:
   receiving configuration information for type priority sent by a base station, wherein the configuration information for type priority comprises an association relationship between a communication operation type and a type priority; and
   determining, based on the configuration information for type priority, a first operation priority of a first communication operation and a second operation priority of a second communication operation,
   wherein the method further comprises:
   determining, based on broadcast information sent by the base station, whether the base station stores the configuration information for type priority; and
   in response to the base station storing the configuration information for type priority, sending a request to obtain the configuration information for type priority to the base station.

2. The method according to claim 1, wherein the communication operation type comprises at least one of:
   a SIM card type;
   a communication service type; or
   a paging reason type.

3. The method according to claim 1, wherein the configuration information for type priority is configured to determine an operation priority corresponding to the communication operation type.

4. The method according to claim 1, wherein determining, based on the configuration information for type priority, the first operation priority of the first communication operation and the second operation priority of the second communication operation comprises:
   determining, based on the configuration information for type priority, the first operation priority of the first communication operation and the second operation priority of the second communication operation in response to a conflict occurs between the first communication operation and the second communication operation.

5. The method according to claim 1, further comprising:
   performing the first communication operation or the second communication operation based on the first operation priority and the second operation priority.

6. The method according to claim 5, wherein performing the first communication operation or the second communication operation based on the first operation priority and the second operation priority comprises:
   performing the first communication operation in response to the first operation priority of the first communication operation being greater than the second operation priority of the second communication operation; and
   performing the second communication operation in response to the first operation priority of the first communication operation being less than the second operation priority of the second communication operation.

7. The method according to claim 6, wherein the communication operation type comprises a paging reason type and/or a SIM card type, the first communication operation comprises responding to a first paging via a first SIM card, and the second communication operation comprises responding to a second paging via a second SIM card.

8. The method according to claim 6, wherein the first communication operation comprises sending and receiving service information via a first SIM card, and the second communication operation comprises responding to a paging via a second SIM card.

9. The method according to claim 5, wherein performing the first communication operation or the second communication operation based on the first operation priority and the second operation priority comprises:

allocating different transmission resources for the first communication operation and the second communication operation based on the first operation priority and the second operation priority; and performing the first communication operation and the second communication operation through different transmission resources, wherein the first communication operation and the second communication operation are associated with a first SIM card or a second SIM card respectively.

10. The method according to claim 1, wherein the configuration information for type priority is carried in broadcast information and/or unicast information sent by the base station.

11. A method for priority configuration, applied to a base station, comprising:

sending configuration information for type priority to a terminal, wherein the configuration information for type priority comprises an association relationship between a communication operation type and a type priority, wherein the method further comprises:

sending broadcast information to the terminal, wherein the broadcast information is configured to indicate that the base station stores the configuration information for type priority, wherein sending the configuration information for type priority to the terminal comprises:

sending the configuration information for type priority to the terminal in response to receiving a request to obtain the configuration information for type priority sent by the terminal.

12. The method according to claim 11, wherein the communication operation type comprises at least one of:

a SIM card type;

a communication service type; or a paging reason type.

13. The method according to claim 11, wherein the configuration information for type priority is configured to determine an operation priority corresponding to the communication operation type.

14. The method according to claim 11, wherein the configuration information for type priority is sent via broadcast information and/or unicast information.

15. The method according to claim 11, wherein sending the configuration information for type priority to the terminal comprises:

sending the configuration information for type priority to more than one terminal, wherein the configuration information for type priority sent to different terminals is different, or the configuration information for type priority sent to at least two of the different terminals is the same.

16. The method according to claim 11, further comprising:

obtaining the configuration information for type priority from a core network.

17. A terminal, comprising:

a processor;

a memory configured to store processor-executable instructions;

wherein the processor is configured to implement a method for priority configuration, comprising:

receiving configuration information for type priority sent by a base station, wherein the configuration information for type priority comprises an association relationship between a communication operation type and a type priority; and determining, based on the configuration information for type priority, a first operation priority of a first communication operation and a second operation priority of a second communication operation, wherein the method further comprises:

determining, based on broadcast information sent by the base station, whether the base station stores the configuration information for type priority; and in response to the base station storing the configuration information for type priority, sending a request to obtain the configuration information for type priority to the base station.

18. A base station, comprising:

a processor;

a memory configured to store processor-executable instructions;

wherein the processor is configured to implement the method for priority configuration of claim 11.

\* \* \* \* \*